April 12, 1949. W. C. JOHNSON ET AL 2,466,990
SINGLE DISK BRAKE
Filed Nov. 8, 1944 2 Sheets-Sheet 2

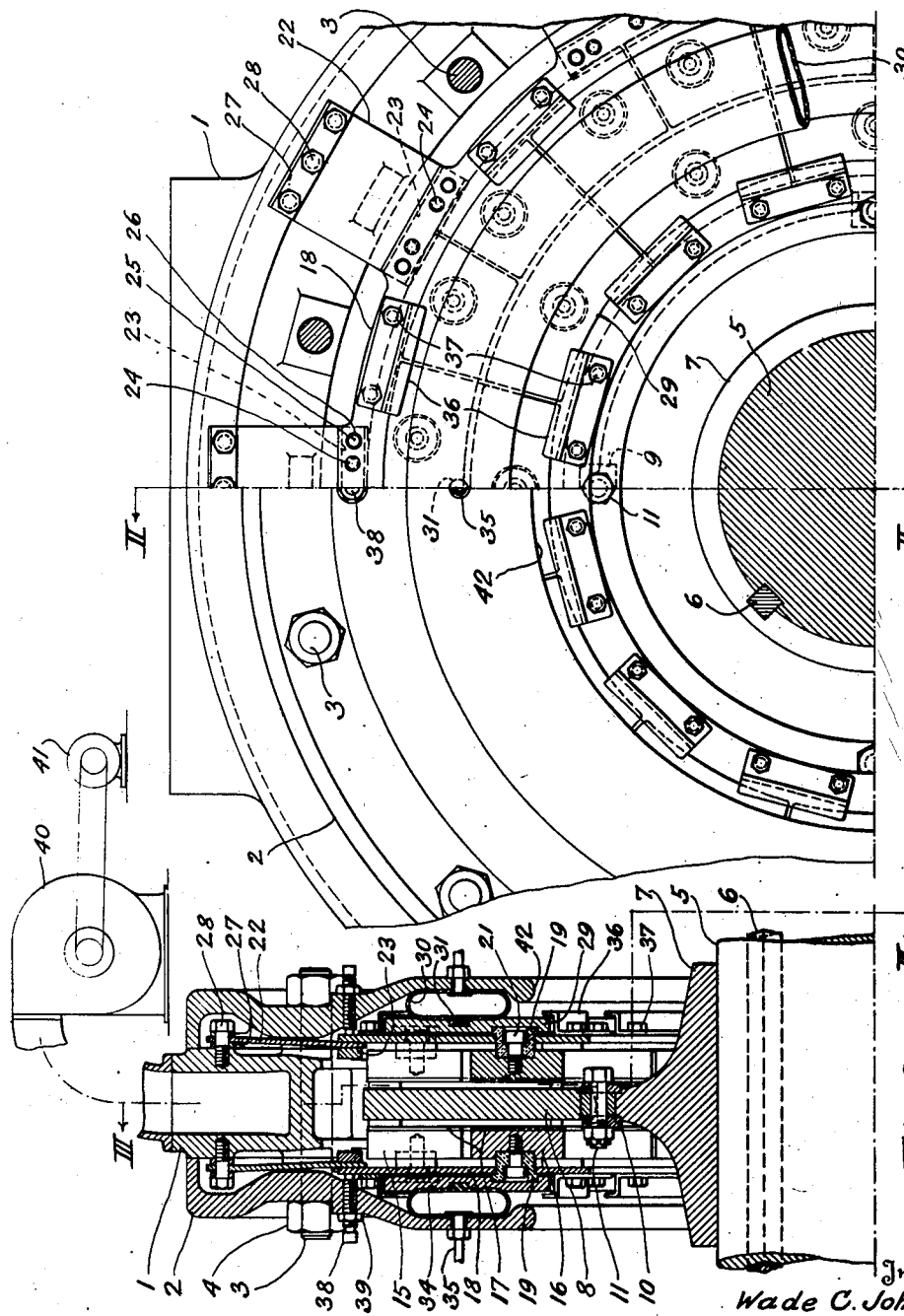

Inventor
Wade C. Johnson
Harry A. Trishman
Edgar H. Stratton
By
Attorney

Patented Apr. 12, 1949

2,466,990

UNITED STATES PATENT OFFICE 2,466,990

SINGLE DISK BRAKE

Wade C. Johnson, Cuyahoga Falls, Harry A. Trishman, Hudson, and Edgar H. Stratton, Cuyahoga Falls, Ohio, assignors of one-half to Wingfoot Corporation, Akron, Ohio, a corporation of Delaware, and one-half to The Adamson Machine Company, Akron, Ohio, a corporation of Ohio Application November 8, 1944, Serial No. 562,414

25 Claims. (Cl. 188—152)

This invention relates to the construction of brakes and, in particular, to a brake of the single disk type for heavy duty use, operated by annular fluid pressure bags.

Hitherto, brakes of this type had a relatively short life and did not work entirely satisfactorily, unless they were made relatively large and heavy.

It is the general object of the invention to avoid and overcome the foregoing and other difficulties of and objections to prior art practices by the provision of improved brake constructions of the character indicated.

Another object of the invention is to provide a brake structure having greater flexibility of the brake shoes in contact with the brake disk, resulting in better efficiency.

Another object of the invention is to provide air spaces around the brake shoes for a more rapid heat dissipation.

Another object of the invention is to obtain uniform temperature distribution over the brake disk to prevent its warping.

Another object of this invention is a sufficient and reliable brake-cooling system.

Still another object of this invention is simple assemblage of all brake parts.

The aforesaid objects of the invention and other objects which will become apparent as the description proceeds, are achieved by the construction of a stationary brake housing on which the brake elements acting from both sides upon the brake disk are resiliently mounted. In order to avoid or to reduce as much possible stresses in and warping of the disk due to temperature differences, the disk and its hub are made in two pieces. The brake shoes consist of highly heat conductive material of massive cross-section, which, together with a blower system, keeps the brake temperature within safe limits. Usually, it is the practice that a number of such brakes are operated together upon a single shaft supported by bearings separate from the brake housing, for instance, for tire test stands. Depending on the torque forces to be destroyed, the number of brake units to be applied is selected.

For a better understanding of this invention, reference should be had to the accompanying drawings wherein:

Fig. 1 is a fragmentary side view of the invention, one-half of which is shown with the housing cover removed;

Fig. 2 is a cross-sectional view taken on line II—II of Fig. 1;

Figure 3:
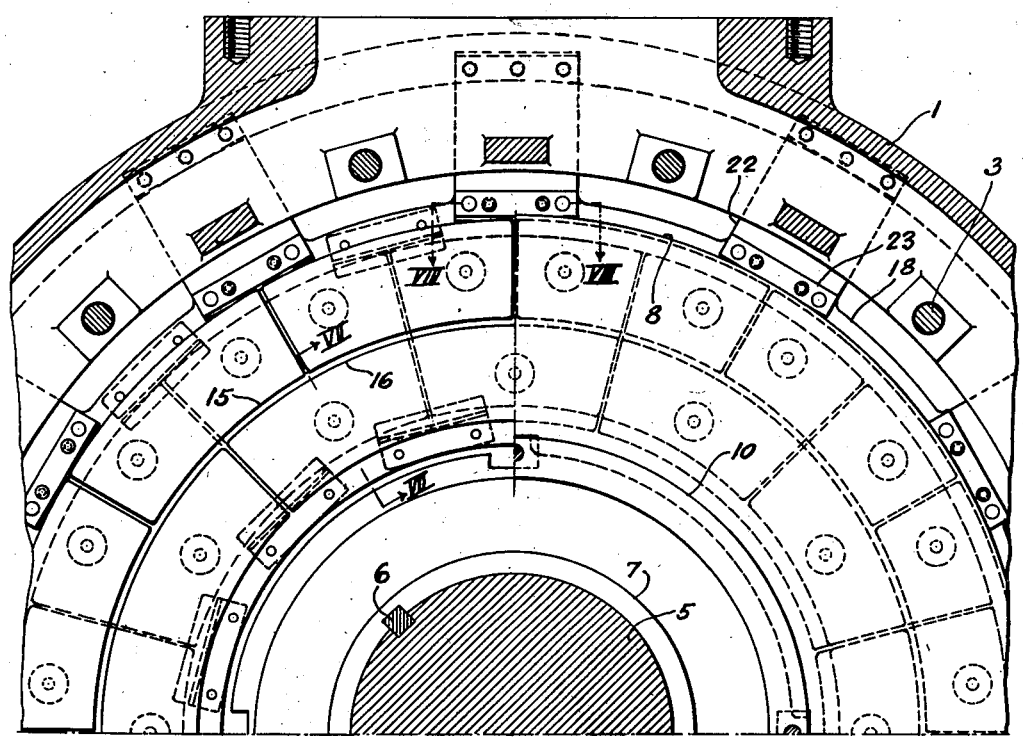
Fig. 3 is a cross-sectional side view taken on line III—III of Fig. 2, the left half of which is shown with the brake disk removed.
Figure 4:
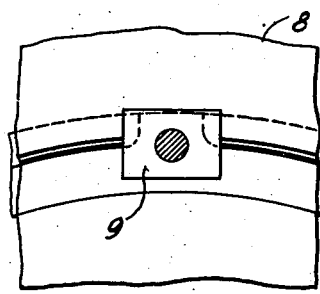
Figure 5:
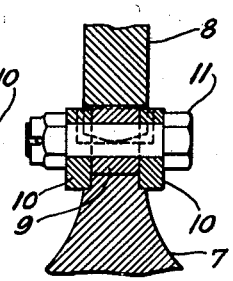
Figure 7:
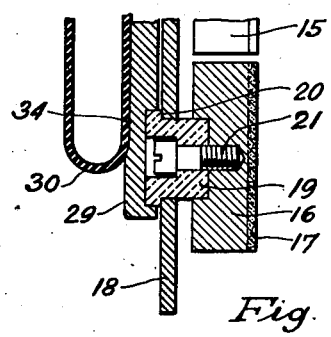
Figure 6:
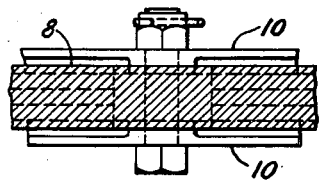
Figure 8:
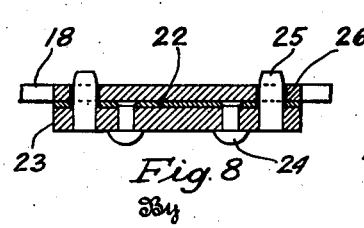

Figs. 4, 5, and 6 show, in larger scale, the connection of the brake disk with its hub;

Fig. 7 is a cross-sectional view in larger scale, taken on line VII—VII of Fig. 3 of the brake shoe fastening; and Fig. 8 is a cross-sectional view taken on line VIII—VIII of Fig. 3.

Although the principles of the invention are broadly applicable for brakes in connection with any power shaft, it is particularly adapted for heavy duty service and hence has been so illustrated and described.

With specific reference to the form of the invention illustrated in the drawing, the numeral 1 indicates a fixed brake housing including side covers 2 fastened thereto by studs 3 and nuts 4. The shaft 5 rotates within the housing, running in bearings (not shown) outside of the brake housing, and to which is fastened, by keys 6, the hub 7. This hub carries the ground, polished, and chromium plated brake disk 8 connected thereto by keys 9 and held in place by key clamp rings 10 and bolts 11, permitting slight lateral movement of the brake disk 8 for self-adjustment.

The segmental brake shoes 15, twelve in number, and 16, six in number, made preferably of heavy copper stock and provided with a friction lining 17 of sintered metal, are arranged slightly spaced from each other in two concentric rings at both sides of the brake disk. They are attached in spaced relation to torque plates 18 by means of cylindrical inserts 19, having shoulders 20 and being made of heat insulating material and which fit into cavities of the brake shoes to which they are fastened by head screws 21. The torque plates are secured at their outer circumference by radially arranged flat springs 22, which, at their inner ends, are provided with attachment bars 23 fastened to the springs by rivets 24, and into which are pressed pins 25 which fit loosely in holes 26 in the torque plate 18, whereas the outer ends of the springs are held between bars 27 and are fastened by head screws 28 to the housing 1. On the outside of the torque plates, applicator plates 29 slightly spaced circumferentially from each other and forming rings press against the enlarged ends of the inserts 19. Each applicator plate, which is slightly spaced laterally from the torque plate, contains, on the inside, three cavities against the bottom of which the insulator inserts are seated, each one pressing against a different brake shoe segment. Thereby, the pressure bags 30, located between the housing covers and the applicator plates into which they are embedded in a groove 34 of slight depth, uniformly distribute the pressure over the circumference of the brake shoe segments, which easily adapt themselves to the shape of the brake disk in case it is slightly warped; at any rate, much better than is possible with a circular shoe made in one piece. Again, dividing the width of the brake shoes into two separate rings will bring about a better contact between the shoes and the disk than shoes made in the full width. With a slightly warped disk, the brake shoe segments can easily adjust themselves to the surface of the disk, since the three-point pressure arrangement of the applicator segments is sufficiently flexible to obtain that effect. Over the circumference of the pressure bags are distributed three bosses 31 which fit into corresponding cavities in the applicator plates and which, together with the pressure fluid inlets 35, passing through the housing covers and connecting to the pressure bags, prevent shifting of the bags.

Applicator clips 36 fastened by head screws 37 to the torque plates restrict lateral movement of the applicator plates 29 and of the parts attached thereto. The distance between the brake shoes and the brake disc can be adjusted by three set screws 38 in the housing covers and which, bearing against the torque plates, are equally distributed over the circumference and secured by nuts 39.

To obtain good brake-cooling, air is pressed through the top of the housing 1 by a blower 40 driven by an electric motor 41, and which leaves through the central openings 42 in the housing covers, thus providing a forced and efficient cooling of all parts concerned. Since the brake shoes are insulated against the torque as well as applicator plates by air and by the inserts 19 and the bags 30, usually made of rubber or the like which material is deleteriously affected by high temperatures, temperatures injurious to such material are obviated, and the brake shoes made of copper or metal having similar properties and heat conductivity will readily dissipate the heat developed by the braking action. This construction also has the advantage that the pressure upon the inner and outer brake-shoe segments can be so distributed that uniform temperature as well as uniform wear of the shoe friction surface can be secured.

Even though it is believed the operation of the apparatus will be apparent from the foregoing description, a brief review thereof will now be made for purposes of summary and simplification. Brakes of the type illustrated and described may be used as a single unit, but are frequently employed in multiples up to six and more, and operating upon one brake shaft, on which a wheel with tire is mounted.

In operating the brake, the pressure bags 30 press against the segmental applicator plates 29 and thereby bring the brake-shoe segments 15 and 16 in contact with the brake disc 8 by means of the heat-insulating inserts 19, all parts of which are mounted on the torque plate 18, which is held against turning by the pins 25 of the flat springs 22 fastened to the housing 1 and capable of retracting the brake shoe. The relatively thin, spring-supported torque plates and the three-point contact applicator plates permit a certain flexibility so that brake-shoe segments can follow slight deformations of the brake disk which may eventually occur.

It will be recognized that the objects of the invention have been achieved by the construction illustrated and described, which has the advantage of being compact, is easily assembled by having the active parts joined together relatively loosely, but which are most positive and effective in operation.

While, in accordance with the Patent Statutes, one best known embodiment of the invention has been illustrated and described in detail, it is to be particularly understood that the invention is not limited thereto or thereby, but that the inventive scope is defined in the appended claims.

We claim:

1. A brake comprising a rotatable torque shaft, a friction disk rotating together with said shaft, a fixed housing enclosing said disk, a cover plate at each side of said housing, torque plates resiliently mounted to said housing, heat-insulating inserts provided with shoulders passing through said torque plates, brake-shoe segments provided with cavities, with said inserts fitting therein and being fastened to said brake shoes, applicator segments slightly spaced from said torque plate and provided with cavities for taking up the other, larger, end of said inserts, retaining means fastened to said torque plate for holding said applicator plates in place, fluid pressure bags between said cover plates and said applicator segments for bringing said brake-shoe segment in operative contact with said friction disk, adjusting screws in said cover plates in contact with said torque plates for adjusting the spacing between said brake-shoe segments and said disk, and blower means forcing air through said housing for cooling the brake.

2. A brake comprising a fixed housing, including cover plates, radially disposed flat springs circumferentially spaced and fastened to both sides of said housing, supporting means secured to said springs, torque plates mounted on said supporting means, heat-insulating applicator inserts passing through said torque plates and resting against the outside thereof, segmental brake shoes forming rings and provided with cavities for seating said inserts therein, and to be attached by said inserts to said torque plates, applicator segments circumferentially slightly spaced from each other, as well as from said torque plate, being in pressure contact with said inserts, and fluid pressure bags between said housing covers and said applicator segments for operating the brake.

3. A brake comprising a fixed housing, including cover plates, radially disposed flat springs circumferentially spaced and fastened to both sides of said housing, supporting means secured to said springs, torque plates mounted on said supporting means, heat-insulating applicator inserts passing through said torque plates and resting against the outside thereof, segmental brake shoes forming rings and provided with cavities for seating said inserts therein, and to be attached by said inserts to said torque plates, applicator segments circumferentially slightly spaced from each other, as well as from said torque plate, being in pressure contact with said inserts, fluid pressure bags between said housing covers and said applicator segments for operating the brake, and set screws in said housing covers in contact with said torque plates for adjusting the lateral position of said brake shoes.

4. A brake comprising a fixed housing, including cover plates, radially disposed flat springs circumferentially spaced and fastened to both sides of said housing, supporting means secured to said springs, torque plates mounted on said supporting means, heat-insulating applicator inserts passing through said torque plates and resting against the outside thereof, segmental brake shoes forming rings and provided with cavities for seating said inserts therein, and to be attached by said inserts to said torque plates, applicator segments circumferentially slightly spaced from each other, as well as from said torque plate, being in pressure contact with said inserts, clips fastened to said torque plate for retaining said applicator segments in their proper position, and fluid pressure bags between said housing covers and said applicator segments for operating the brake.

5. A brake comprising a fixed housing, radially disposed flat retracting springs circumferentially spaced and fastened at both sides to said housing, supporting means secured to said springs, torque plates with the brake shoes attached thereto being slidable over said supporting means and transmitting the brake torque through said springs into said housing.

6. A brake comprising a rotatable torque shaft, a hub securely fastened to said torque shaft, a friction disk keyed to said hub and adapted for slight lateral movement relative said hub, segmental brake shoes made of copper having a layer of sintered metal fused thereon as friction means and forming two separate concentric rings at each side of said friction disk and adapted to be frictionally engageable therewith.

7. In combination with a brake, a rotatable friction disk, brake-shoe segments forming spaced concentric annular friction surfaces at both sides of said friction disk, pressure applicator segments in annular arrangement opposite said brake-shoe segments, heat-insulating applicator inserts between and embedded in said applicator segments and said brake segments, arranged in such a way that three of said inserts in each applicator segment are in operative relation with three of said segments adjacent each other.

8. In combination with a brake, a rotatable friction disk, a resiliently mounted stationary torque plate at each side of said disk, heat-insulating applicator inserts passing through said torque plates and abutting against the outside thereof, heat-conducting brake-shoe segments provided with cavities and forming two annular friction surfaces at each side of said friction disk, pressure applicator plates in annular arrangement at the outside of said torque rings, three of said inserts embedded in each one of said applicator plates, being in operative relation with three of said brake-shoe segments adjacent each other.

9. In combination with a brake, a rotatable friction disk, brake-shoe segments forming two concentric friction rings at each side of said disk, and three point pressure means, each one of said means in pressure contact with two of said outer segments and with one of said inner segments.

10. In combination with a brake, a rotatable friction disk, brake-shoe segments forming concentric rings at each side of said disk and frictionally engageable therewith, pressure applicator plates in annular arrangement, and applicator inserts embedded in said applicator plates and in said brake-shoe segments and fastened to said segments, which are substantially surrounded by air.

11. In combination with a brake, a rotatable friction disk, brake-shoe segments forming at least one ring at each side of said disk and frictionally engageable therewith, and heat insulating pressure transmitting inserts fastened to said segments at widely spaced points, the brake being of an open construction to permit substantially free air flow around the outside of said segments.

12. In combination with a brake, a rotatable friction disk, brake-shoe segments forming at least one ring at each side of said disk and frictionally engageable therewith, heat-insulating pressure inserts fastened to said segments permitting substantially free air flow around the outside of said segments, and pressure applicator plates opposite said segments, each one of said inserts in one of said segments being acted upon by a different applicator plate.

13. A brake comprising a rotatable torque shaft, a friction disk consisting of two parts, the one of said parts being fixed to said shaft and having a circumferential radial extension and the other one of said parts, the friction part, being in the form of an annular disk fitting over and being substantially flush with the side walls of said radial extension, means locking said disk parts together, means securing said locking means but permitting slight lateral movement of said disk parts relative to each other, and brake shoes symmetrically arranged relative to the sides of said brake disk and frictionally engageable therewith.

14. A brake comprising a rotatable torque shaft, a friction disk consisting of two parts, the one of said parts being fixed to said shaft and having a circumferential radial extension and the other one of said parts, the friction part, being in the form of an annular disk fitting over and being substantially flush with the side walls of said radial extension, keys locking said disk parts together, clamping rings securing said locking means but permitting slight lateral movement of said disk parts relative to each other, and brake shoes symmetrically arranged relative to the sides of said brake disk and frictionally engageable therewith.

15. A brake comprising a rotatable torque shaft, a friction disk consisting of two concentric parts one fitting into the other, the inner one of said disk parts being fixed to said torque shaft and being substantially flush with the sides of the outer one of said disk parts, keys for interlocking said disk parts, a pair of clamp rings secured to said inner disk part for holding said keys in position but adapted to permit said outer disk part slight lateral movement to the inner disk part, and two brake shoes parallel and arranged symmetrically to the plane of rotation of said disk, each one of said brake shoes consisting of segments spaced from one another and forming an inner and an outer friction ring frictionally engageable with said disk.

16. A brake comprising a rotatable torque shaft, a hub provided with a circumferential radial extension being fastened to said torque shaft, a friction disk fitting over and being joined with said hub extension, keys for interlocking said disk and said hub, circumferential means for securing said keys against lateral movement and holding said disk in place but permitting it slight lateral movement relative to said hub, brake shoe segments made of copper having a layer of sintered metal fused thereon as friction means, said segments forming two radially spaced, concentric, friction rings at each side of said friction disk being arranged symmetrically thereto and frictionally engageable therewith.

17. In combination with a brake, a rotatable friction disk, and relatively movable brake shoe segments positioned at each side of said disk and disposed symmetrically thereto to form a plurality of radially spaced, concentric, friction rings, frictionally engageable with said disk.

18. In combination with a brake, a rotatable friction disk, brake shoe segments positioned at each side of said disk and disposed symmetrically thereto to form a plurality of radially spaced, concentric, friction rings frictionally engageable with said disk, and a plurality of relatively movable pressure application means in pressure contact with said brake shoe segments, each one of said means being positioned near one set of adjacent brake shoe segments and being adapted to exert pressure thereon.

19. In combination with a brake, a rotatable friction disk, brake-shoe segments forming friction rings which are frictionally engageable with said disk, and separate pressure application means bridging each adjacent pair of segments and operable on each one of such bridged segments simultaneously, said separate pressure application means being adapted to contact only the central sections of the bridged segments and provide only one pressure application point for each segment.

20. In combination with a brake, a fixed housing including cover plates, a friction disk rotatable in said housing, a torque plate resiliently mounted to said housing, pressure applicator segments, retainers holding said segments loosely against said torque plate, insulators pressure engageable with said segments and passing through and beyond said torque plate, heat conducting brake shoe segments forming annular friction surfaces between said disk and said torque plate and being frictionally engageable with said disk, said insulators being fastened to and spacing said brake shoe segments from said torque plate to allow air passing between said brake shoe segments and said torque plate, and pressure means inserted between said applicator segments and said cover plates.

21. In combination with a brake, a housing including side walls, a friction disk rotatable in said housing, a plurality of brake shoe segments frictionally engageable with said disk, torque plates resiliently mounted on said housing and spaced from said brake shoe segments, pressure applicator plates loosely attached to the outside of said torque plates, heat insulators inserted in said torque plates and being movable therein, said insulators being fastened to said brake shoes and pressure-engageable with said applicator segments, pressure means inserted between said side walls and said applicator plates for operating the brake, and means for adjusting the space between said friction disk, and said brake shoe segments.

22. In a brake construction, a housing, an annular torque plate, radially extending spring means resiliently mounting said torque plate in said housing for lateral movement therein, said torque plate being movably associated with said springs, and adjustment means associated with said housing in association with said torque plate for controlling the lateral position of said torque plate without changing the position of said springs.

23. In a brake construction, a rotatable friction disc, a plurality of brake shoe segments associated with opposite sides of said disc in circumferentially spaced arrangement, a plurality of pressure applicator plates in spaced circumferential arrangement on the laterally outer surface of said brake shoe segments, pressure transmitting means connecting local areas of said plates to local areas of at least one of said brake shoe segments, and resilient pressure means associated with said plates for forcing said shoes into substantially uniform engagement with said disc irregardless of the variance in travel of said plates.

24. In a brake construction, a rotatable friction disc, a plurality of relatively movable shoe segments associated with opposite sides of said disc in circumferentially spaced arrangement, and a plurality of relatively movable pressure applicator plates in spaced circumferential arrangement on the outer surface of said brake shoe segments, with each plate being adapted to transmit braking pressures to local areas of at least one of said brake shoe segments.

25. In a brake construction, a rotatable friction disc, a plurality of brake shoe segments associated wtih said disc, pressure applicator means on the outer surface of said brake shoe segments, heat insulating and pressure transmitting means connecting said plates to said brake shoes, and positioning means for said brake shoe segments engaging with said heat insulating and pressure transmitting means to position said brake shoe segments, and blower means for blowing air past said brake shoe segments.

WADE C. JOHNSON.
HARRY A. TRISHMAN.
EDGAR H. STRATTON.

REFERENCES CITED

The following references are of record in the file of this patent:

UNITED STATES PATENTS

| Number | Name | Date |
|---|---|---|
| 1,959,049 | Buus | May 15, 1934 |
| 2,028,488 | Avery | Jan. 21, 1936 |
| 2,084,216 | Poage | June 15, 1937 |
| 2,366,093 | Forbes | Dec. 26, 1944 |
| 2,375,855 | Lambert | May 15, 1945 |
| 2,405,219 | Lambert | Aug. 6, 1946 |